US012726564B2

(12) United States Patent
Pan et al.

(10) Patent No.: US 12,726,564 B2
(45) Date of Patent: Sep. 1, 2026

(54) 5G ICON DISPLAY CONTROL METHOD, APPARATUS, TERMINAL DEVICE, AND STORAGE MEDIUM

(71) Applicant: TCL COMMUNICATION (NINGBO) CO., LTD., Ningbo (CN)

(72) Inventors: Jianglong Pan, Ningbo (CN); Yongzhen Wang, Ningbo (CN)

(73) Assignee: TCL COMMUNICATION (NINGBO) CO., LTD., Ningbo (CN)

( * ) Notice: Subject to any disclaimer, the term of this patent is extended or adjusted under 35 U.S.C. 154(b) by 296 days.

(21) Appl. No.: 18/560,407

(22) PCT Filed: Aug. 6, 2021

(86) PCT No.: PCT/CN2021/111165
§ 371 (c)(1),
(2) Date: Nov. 13, 2023

(87) PCT Pub. No.: WO2022/236981
PCT Pub. Date: Nov. 17, 2022

(65) Prior Publication Data

US 2024/0251033 A1 Jul. 25, 2024

(30) Foreign Application Priority Data

May 13, 2021 (CN) ......................... 202110520437.8

(51) Int. Cl.

| | |
|---|---|
| ***H04M 1/72469*** | (2021.01) |
| ***H04W 68/00*** | (2009.01) |
| ***H04W 88/06*** | (2009.01) |

(52) U.S. Cl.
CPC ....... *H04M 1/72469* (2021.01); *H04W 68/00* (2013.01); *H04W 88/06* (2013.01)

(58) Field of Classification Search
CPC . H04M 1/72469; H04W 68/00; H04W 88/06; H04W 24/02; Y02D 30/70; G06F 3/04817; G06F 3/1407
See application file for complete search history.

(56) References Cited

U.S. PATENT DOCUMENTS

| | | | |
|---|---|---|---|
| 2020/0100181 | A1 | 3/2020 | Jia et al. |
| 2020/0344839 | A1 | 10/2020 | Kwok et al. |

FOREIGN PATENT DOCUMENTS

| | | | |
|---|---|---|---|
| AU | 2019312061 | A1 | 6/2020 |
| CN | 107396337 | A | 11/2017 |

(Continued)

OTHER PUBLICATIONS

International Search Report in International application No. PCT/CN2021/111165,mailed on Jan. 26, 2022.

(Continued)

*Primary Examiner* — Curtis A Kuntz
(74) *Attorney, Agent, or Firm* — PV IP PC; Wei Te Chung

(57) ABSTRACT

The present disclosure provides a 5G icon display control method, a terminal device, and a storage medium. The 5G icon display control method includes: determining a target 5G icon display condition based on target setting information; obtaining a network status parameter; and displaying a 5G icon, in response to the network status parameter meeting the target 5G icon display condition. The network status parameter includes at least one of a 5G network registration status, a E-UTRAN new radio dual connection status, an LTE network connection status, or a 5G/LTE dual connection network coverage status. When the target setting information is a network operator used by the terminal device, the terminal device may adopt different 5G icon display conditions according to different network operators.

15 Claims, 3 Drawing Sheets

(56) References Cited

FOREIGN PATENT DOCUMENTS

| | | | | |
|---|---|---|---|---|
| CN | 110839106 | A | | 2/2020 |
| CN | 111246543 | A | | 6/2020 |
| CN | 111343699 | A | | 6/2020 |
| CN | 111787562 | A | | 10/2020 |
| CN | 112601237 | A | | 4/2021 |
| CN | 110691392 | B | * | 2/2022 |
| WO | WO2020/042181 | A1 | * | 3/2020 |

OTHER PUBLICATIONS

Written Opinion of the International Search Authority in International application No. PCT/CN2021/111165,mailed on Jan. 26, 2022.
Notification to Grant Patent Right for Invention issued in corresponding Chinese Patent Application No. 202110520437.8 dated Jul. 19, 2022, pp. 1-4.
Chinese Office Action issued in corresponding Chinese Patent Application No. 202110520437.8 dated Jan. 28, 2022, pp. 1-6.
3gPP TSG CT meeting 78CP-173119 GSM Association Future Networks Programme "LS Reply to 3GPP SA2 on Status Icon related to 5G" section2, claim1-10.

* cited by examiner

Condition determining module

Parameter obtaining module

Icon display control module

5G ICON DISPLAY CONTROL METHOD, APPARATUS, TERMINAL DEVICE, AND STORAGE MEDIUM

CROSS-REFERENCE TO RELATED APPLICATIONS

This application is a national phase application of International Application No. PCT/CN2021/111165 field on Aug. 6, 2021, which claims priority to Chinese Patent Application No. 202110520437.8, filed on May 13, 2021. The contents of the aforementioned applications are incorporated herein by reference in their entireties.

TECHNICAL FIELD

The present disclosure relates to a field of intelligent terminal devices, and in particular, to a 5G icon display control method, a terminal device, and a storage medium.

BACKGROUND 5G network is a fifth-generation mobile communication network. In comparison with previous four-generation mobile networks, the 5G network exhibits an enhanced function in practical application. With the development of technology, the popularity of 5G network is getting higher and higher, and many terminal devices support the 5G network.

The terminal device displays the 5G icon on a desktop to show whether the 5G network is available. However, there are many network operators at present. The same terminal device may receive the network services provided by different network operators by inserting cards from the different network operators. That is, even the terminal devices of the same model manufactured by the same manufacturer may use the network services provided by different network operators. Because different network operators have different standards on whether the 5G network is available, there is no method to meet the needs of displaying 5G icon for various network operators.

SUMMARY

The present disclosure provides a 5G icon display control method, an apparatus, a terminal device, and a storage medium, to solve a problem in the prior art that not all of various network operators have met to a 5G icon display requirement.

In order to solve the above technical problems, the technical solutions according to an embodiment of the present disclosure are as follows.

In a first aspect of the present disclosure, a 5G icon display control method is provided, including:

- determining a 5G icon display condition corresponding to target setting information as a target 5G icon display condition based on pre-stored correspondence between setting information and the 5G icon display condition;
- obtaining a network status parameter; and
- displaying a 5G icon, in response to the network status parameter meeting the target 5G icon display condition,
- wherein the network status parameter comprises at least one of a E-UTRAN new radio dual connection status, an LTE network connection status, or a 5G/LTE dual connection network coverage status, and
- wherein the target setting information is a network operator being used.

In an embodiment, the displaying of the 5G icon in response to the network status parameter meeting the target 5G icon display condition comprises:

- displaying the 5G icon when the E-UTRAN new radio dual connection status in the network status parameter is “available” and “unrestricted”, the 5G/LTE dual connection network coverage status is a covered state, and the LTE network connection status is an unconnected state.

In an embodiment, the displaying of the 5G icon in response to the network status parameter meeting the target 5G icon display condition comprises:

- displaying the 5G icon when the E-UTRAN new radio dual connection status in the network status parameter is “available” and “unrestricted”, the LTE network connection status is a connected state, and the 5G/LTE dual connection network coverage status is a covered state.

In an embodiment, the determining of the 5G icon display condition corresponding to the target setting information as the target 5G icon display condition based on the pre-stored correspondence between the setting information and the 5G icon display condition comprises:

- receiving a target instruction, and determining the target setting information based on the target instruction.

In an embodiment, the obtaining of the network status parameter comprises:

- establishing a connection with a base station, and receiving information sent by the base station to obtain the network status parameter.

In an embodiment, the receiving of the information sent by the base station to obtain the network status parameter comprises:

- by receiving the information from the base station through a network module, obtaining the network status parameters; and
- reporting the network status parameter to a framework layer through the network module.

In a second aspect of the present disclosure, a 5G icon display control method is provided, including:

- determining a target 5G icon display condition based on target setting information;
- obtaining a network status parameter; and
- displaying a 5G icon, in response to the network status parameter meeting the target 5G icon display condition,
- wherein the network status parameter comprises at least one of a 5G network registration status, a E-UTRAN new radio dual connection status, an LTE network connection status, or a 5G/LTE dual connection network coverage status.

In an embodiment, the determining of the target 5G icon display condition based on the target setting information comprises:

- determining a 5G icon display condition corresponding to the target setting information as the target 5G icon display condition based on pre-stored correspondence between setting information and the 5G icon display condition.

In an embodiment, the displaying of the 5G icon in response to the network status parameter meeting the target 5G icon display condition comprises:

- displaying the 5G icon when the 5G network registration status in the network status parameter is a registered state.

In an embodiment, the displaying of the 5G icon in response to the network status parameter meeting the target 5G icon display condition comprises:

displaying the 5G icon when the E-UTRAN new radio dual connection status in the network status parameter is "available" and "unrestricted", the 5G/LTE dual connection network coverage status is a covered state, and the LTE network connection status is an unconnected state.

In an embodiment, the displaying of the 5G icon in response to the network status parameter meeting the target 5G icon display condition comprises:

displaying the 5G icon when the E-UTRAN new radio dual connection status in the network status parameter is "available" and "unrestricted", the LTE network connection status is a connected state, and the 5G/LTE dual connection network coverage status is a covered state.

In an embodiment, the displaying of the 5G icon in response to the network status parameter meeting the target 5G icon display condition comprises:

displaying the 5G icon when the new E-UTRAN dual radio connection status in the network status parameter is "available" and "unrestricted".

In an embodiment, the target setting information is a network operator being used.

In an embodiment, the target setting information is application environment information.

In an embodiment, the 5G icon display control method further includes: before determining the target 5G icon display condition based on the target setting information, receiving a target instruction, and determining the target setting information based on the target instruction.

In an embodiment, the obtaining of the network status parameter comprises:

establishing a connection with a base station, and receiving information sent by the base station to obtain the network status parameter.

In an embodiment, the receiving of the information sent by the base station to obtain the network status parameter comprises:

by receiving the information from the base station through a network module, obtaining the network status parameters; and reporting the network status parameter to a framework layer through the network module.

In a third aspect of the present disclosure, a 5G icon display control apparatus is provided, including:

a target display condition determining module configured to determine a target 5G icon display condition based on target setting information;

a network status parameter obtaining module configured to obtain a network status parameter; and a 5G icon display control module configured to display a 5G icon in response to the network status parameter meeting the target 5G icon display condition.

In a fourth aspect of the present disclosure, a terminal device is provided, the terminal device comprises a processor, a computer readable storage medium communicatively connected to the processor, wherein the computer readable storage medium is configured to store a plurality of instructions, the processor is configured to invoke instructions in the computer readable storage medium to perform operations of implementing the 5G icon display control method described above.

In a fifth aspect of the present disclosure, provided is a computer readable storage medium storing one or more programs executable by one or more processors to implement operations in the 5G icon display control method described above.

Compared with the prior art, the disclosed embodiments have the following advantages:

Compared with the prior art, an embodiment of the present disclosure provides a 5G icon display control method, an apparatus, a terminal device, and a storage medium. The 5G icon display control method includes: determining a target 5G icon display condition based on target setting information; and displaying a 5G icon, in response to the network status parameter meeting the target 5G icon display condition. Therefore, when the target setting information is a network operator used by the terminal device, the terminal device may adopt different 5G icon display conditions according to different network operators, to display 5G icon for various network operators.

BRIEF DESCRIPTION OF THE DRAWINGS

In order to more clearly describe technical solutions in embodiments of the present disclosure or the related art, the accompanying drawings required in the description of the embodiments or the related art will be briefly described below. Apparently, the accompanying drawings in the following description are merely some embodiments of the present disclosure. Other drawings may be obtained by a person of ordinary skill in the art without creative efforts.

DETAILED DESCRIPTION

In order that embodiments of the present disclosure may be better understood by those skilled in the art, the embodiments of the present disclosure will be described more clearly and completely below in conjunction with the accompanying drawings in the embodiments of the present disclosure. Apparently, the described embodiments are only a part of the embodiments of the present disclosure, and not all of the embodiments. Based on the embodiments in the present disclosure, all other embodiments obtained by a person of ordinary skill in the art without creative work are within the scope of the present disclosure.

The 5G icon display control method according to the embodiments of the present disclosure is applied to a terminal device that may support at least one network operator. The terminal device may display a 5G icon on a screen to prompt that the 5G network is available. The terminal device may include, but is not limited to, a computer, a mobile phone, a tablet computer, an in-vehicle device, a wearable device, or the like.

Figure 1:
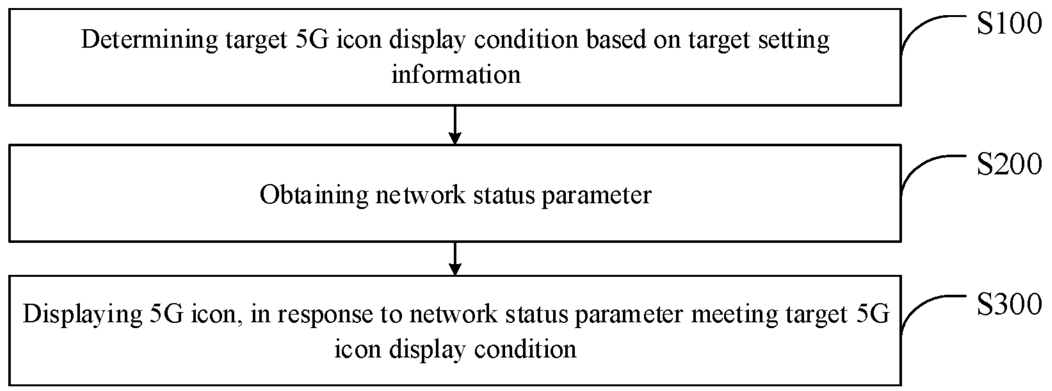
FIG. 1 is a flowchart of an embodiment of a 5G icon display control method according to an embodiment of the present disclosure.

Referring to FIG. 1, FIG. 1 is a flow chart of a 5G icon display control method according to an embodiment of the present disclosure. The 5G icon display control method is implemented by the following step.

At Step S100, a target 5G icon display condition is determined based on target setting information.

The target setting information may be a network operator used by a terminal device that modifies the target setting information according to the network operator being used or operating. The target setting information may further be other information. For example, some users wish to select different 5G icon display conditions according to different use environments. For example, if the 5G icon is displayed as long as there is 5G network coverage when outdoors, and only when it is connected to the 5G network when indoors, the target setting information may be the environment information inputted by the user, i.e. the user inputs specific application environment information, and then the terminal device determines the corresponding 5G icon display condition according to the application environment selected by the user.

In an alternative implementation, the 5G icon display control method according to an embodiment of the present embodiment is further implemented by the following step: before the target 5G icon display condition is determined based on the target setting information, a target instruction is received, and the target setting information is determined according to the target instruction.

When the target setting information is environment information selected by a user, the user may send the target instruction to the terminal device through an input device such as a touch screen or a keyboard of the terminal device. The target instruction includes setting information. The terminal device updates the target setting information to the setting information included in the target instruction after receiving the target instruction. When the target setting information is the network operator being used by the terminal device, the terminal device may generally automatically identify the network operator currently used and then determine the target setting information. If the terminal device cannot identify the network operator being used, the target instruction including the network operator may further be sent by the user, and the terminal device, upon receiving the target instruction, determines the network operator included in the target instruction as the target setting information.

After the target setting information is determined, a target 5G icon display condition is determined based on the target setting information. Specifically, the determining of the target 5G icon display condition based on the target setting information includes:

determining the 5G icon display condition corresponding to the target setting information as the target 5G icon display condition based on the pre-stored correspondence between the setting information and the 5G icon display condition.

Specifically, in the 5G icon display control method according to an embodiment, a correspondence between the setting information and the 5G icon display condition may be stored in the terminal device in advance. That is, a plurality of 5G icon display conditions and a plurality of setting information may be stored in the mobile terminal in advance. The plurality of 5G icon display conditions correspond to the setting information. That is, what setting information is set to corresponds to what 5G icon display condition. After the target setting information is obtained, a 5G icon display condition corresponding to the target setting information is searched as the target 5G icon display condition according to the correspondence between the setting information and the 5G icon display condition. The target 5G icon display condition is used as a judgment criterion of whether to display the 5G icon.

Referring again to FIG. 1, the 5G icon display control method according to an embodiment is further implemented by the following step.

At Step S200, a network status parameter is obtained.

The network status parameter is a parameter reflecting a network status of the terminal device. The network status parameter includes at least one of a 5G network registration status, a E-UTRAN (E-UMTS Terrestrial Radio Access Network) new radio dual connection status, an LTE (Long Term Evolution) network connection status, a 5G network coverage status, or a 5G/LTE dual connection network coverage status.

Specifically, the 5G network registration status reflects whether the terminal device is actually registered to the 5G network. The E-UTRAN new radio dual connection status reflects whether the E-URRAN new radio dual connection is available for the terminal device and whether the E-URRAN new radio dual connection is restricted. The E-UTRAN new radio dual connection short for ENDC, which allows the user equipment to connect to the LTE enodeB serving as the primary node and the 5G gnodeB serving as the secondary contact according to the 3GPP standard document, and allows the device to simultaneously access the LTE and the 5G on the same frequency band. The LTE network connection status reflects whether the terminal device is connected to the LTE network. The 5G network coverage status reflects whether the terminal device is in the 5G network coverage area. The 5G/LTE dual connection network coverage status reflects whether the terminal device is within 5G/LTE dual connection network coverage.

The network status parameter is obtained after the terminal device interacts with the base station. That is, the obtaining of the network status parameter includes the following step:

establishing a connection with a base station, and receiving information sent by the base station to obtain the network status parameter.

Figures 2, 3:
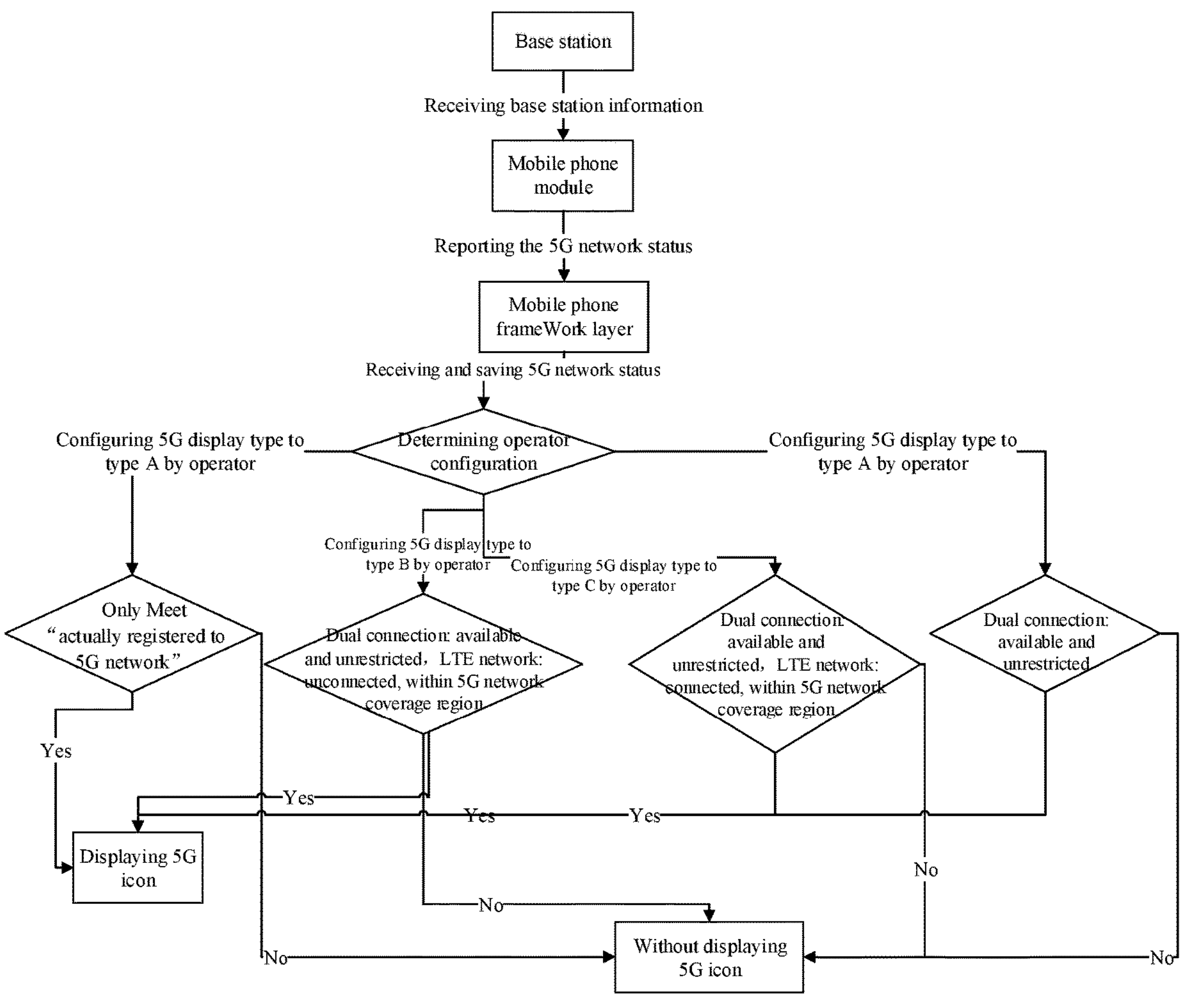
FIG. 2 is a logical block diagram of displaying a 5G icon on a terminal device in a 5G icon display control method in an embodiment of the present disclosure.
FIG. 3 is a schematic block diagram of a 5G icon display control device according to the present disclosure.

Specifically, a base station, that is, a public mobile communication base station, is an interface device for a mobile device to access the Internet, and is also a form of a radio station. The base station refers to a radio transceiver station that transmits information to and from a mobile terminal device through a mobile communication switching center in a certain radio coverage region. As shown in FIG. 2, in an example in which the terminal device is a mobile phone, a network status parameter obtaining module (Modem) in a mobile phone establishes a connection with the base station and receives information from the base station, to obtain the network status parameter. Specifically, methods of obtaining different network status parameter are different. For example, for 5G network registration status, it is required for the terminal device to carry out a 5G network registration process with a base station. The terminal device interacts with the base station, and when the terminal device is successfully registered, the 5G network registration status is "registered", otherwise it is "unregistered".

The network module in the mobile phone receives the information from the base station to obtain the network status parameter, and reports the network status parameter to the mobile phone framework layer. The mobile phone framework layer receives and saves the network status parameter, determines a corresponding 5G icon display condition (that is, the target 5G icon display condition) according to the configuration information of the network operator, and determines whether the network status parameter satisfies the target 5G icon display condition.

Specifically, a variable corresponding to the network status parameter may be set in the terminal device. The information is interacted between the terminal device and the base station, and the terminal device receives the information from the base station, to obtain a network actual parameter. The network actual parameter is assigned to corresponding variables, to obtain the network status parameter. Specifically, taking the terminal device as an Android system as an example, the following variable may be set in the terminal device.

isEnDcAvailable and isDcNrRestricted is used for indicating the E-UTRAN new radio dual connection status. isEnDcAvailable indicates whether the E-UTRAN new radio dual connection is available (1 indicates "available" and 0 indicates "unavailable"), and from interaction between the terminal device and the base station, a result of whether the E-UTRAN new radio dual connection is available is obtained. isDcNrRestricted indicates whether the E-UTRAN new radio dual connection is restricted (1 denotes "restricted" and 0 denotes "unrestricted"), and from the interaction of the terminal device and the base station, a result of whether the E-UTRAN new radio dual connection is in an access-restricted status is obtained.

isNrAvailable indicates whether 5G/LTE dual connection network coverage is detected (1 indicates "coverage" and 0 indicates "no coverage"), and from the interaction of the terminal device and the base station, currently covered network is obtained.

isNrBearerAllocated indicates whether to actually register the 5G network (1 indicates "actually registered" and 0 indicates "not registered"), and from the interaction of the terminal device and the base station, whether to actually register the 5G network is obtained.

isLteConnected indicates whether to be connected to the LTE network (1 indicates "connected", 0 indicates "unconnected"), and from the interaction of the terminal device and the base station, whether to be actually connected to the LTE network.

Referring again to FIG. 1, after the network status parameter is obtained, the 5G icon display control method according to an embodiment is further implemented by the following step.

At Step S300, in response to the network status parameter meeting the target 5G icon display condition, a 5G icon is displayed.

After the network status parameter and the target 5G icon display condition are obtained, the following steps will be performed.

In an alternative implementation, the displaying of the 5G icon in response to the network status parameter meeting the target 5G icon display condition is implemented by the following step:

The 5G icon is displayed when the 5G network registration status in the network status parameter is a registered state.

In this implementation, the target 5G icon display condition is a condition that it is actually registered with to 5G network. That is, only in response that the terminal device is successfully registered to the 5G network, the 5G icon is displayed on the display screen of the terminal device. In response that the above condition is not met, the terminal device does not display the 5G icon.

In an alternative implementation, the displaying of the 5G icon in response to the network status parameter meeting the target 5G icon display condition is implemented by the following step:

The 5G icon is displayed when the E-UTRAN new radio dual connection status in the network status parameter is "available" and "unrestricted", the 5G/LTE dual connection network coverage status is a covered state, and the LTE network connection status is an unconnected state.

In this implementation, the target 5G icon display condition includes three conditions: the E-UTRAN new radio dual connection status being "available" and "unrestricted", within the 5G/LTE dual connection network coverage region, and without being connected to the LTE network connection status. The above three conditions need to be met at the same time, otherwise the terminal device does not display the 5G icon.

In an alternative implementation, the displaying of the 5G icon in response to the network status parameter meeting the target 5G icon display condition is implemented by the following step:

The 5G icon is displayed when the E-UTRAN new radio dual connection status in the network status parameter is "available" and "unrestricted", the LTE network connection status is a connected state, and the 5G/LTE dual connection network coverage status is a covered state.

In this implementation, the target 5G icon display condition includes three conditions of: the E-UTRAN new radio dual connection status being "available" and "unrestricted", within the 5G/LTE dual connection network coverage region, and having been connected to the LTE network connection status. The above three conditions need to be met at the same time, otherwise the terminal device does not display the 5G icon.

In an alternative implementation, the displaying of the 5G icon in response to the network status parameter meeting the target 5G icon display condition is implemented by the following step:

The 5G icon is displayed when the new E-UTRAN dual radio connection status in the network status parameter is "available" and "unrestricted".

In this implementation, the target 5G icon display condition is that the E-UTRAN new radio dual connection status is "available" and "unrestricted". If the condition is not met, the terminal device does not display the 5G icon.

In sum, the present disclosure provides a 5G icon display control method, in which a target 5G icon display condition is determined according to target setting information, and a 5G icon is displayed when a network status parameter meets a target 5G icon display condition. In this way, when the target setting information is a network operator used by a terminal device. The terminal device may adopt different 5G icon display conditions according to different network operators, thereby implementing adaptation of 5G icon display requirements for multiple operators.

It is to be understood that although the steps in the flow charts provided in the drawings of the present disclosure are shown sequentially as indicated by the arrows, these steps are not necessarily performed sequentially as indicated by the arrows. Unless explicitly stated herein, the execution of the steps in the specification is not limited in strict order, and the steps may be executed in other orders. Further, at least a portion of the steps in the specification may include a plurality of sub-steps or a plurality of stages, which are not necessarily performed at the same time, but may be performed at different times. The sub-steps or stages are not necessarily performed sequentially, but may be performed alternately with other steps or at least a portion of the sub-steps or stages of other steps.

A person of ordinary skill in the art may understand that all or parts of the processes for implementing the methods in the above-described embodiments may be implemented by instructing relevant hardware by a computer program. The computer program may be stored in a non-volatile computer readable storage medium, and the computer program may, when executed, include the processes of the methods according to the embodiments described above. Any reference to a memory, storage, database, or other medium according to an embodiment of the present disclosure may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is implemented in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink), DRAM (SLDRAM), memory bus (Rambus), direct RAM (RDRAM), direct memory bus dynamic RAM (DRDRAM), and memory bus dynamic RAM (RDRAM).

Based on the 5G icon display control method according to the above embodiment, the present disclosure further provides a 5G icon display control apparatus. As shown in FIG. 3, the 5G icon display control apparatus includes:

- a target display condition determining module configured to determine a target 5G icon display condition based on target setting information, as described in the above embodiment;
- a network status parameter obtaining module configured to obtain a network status parameter, as described in the above embodiment;
- a 5G icon display control module configured to display a 5G icon in response to the network status parameter meeting the target 5G icon display condition.

In an alternative implementation, the target display condition determining module is configured to determine the 5G icon display condition corresponding to the target setting information as the target 5G icon display condition based on the pre-stored correspondence between the setting information and the 5G icon display condition, as described in the above embodiment.

In an alternative implementation, the network status parameter obtaining module is configured to establish a connection with a base station, and receive information sent by the base station to obtain the network status parameter.

In an alternative implementation, the 5G icon display control module is configured to display the 5G icon when the 5G network registration status in the network status parameter is a registered status, as described in the above embodiment.

In an alternative implementation, the 5G icon display control module is configured to display the 5G icon when the E-UTRAN new radio dual connection status in the network status parameter is “available” and “unrestricted”, the 5G/LTE dual connection network coverage status is a covered state, and the LTE network connection status is an unconnected state, as described in the above embodiment.

In an alternative implementation, the 5G icon display control module is configured to display the 5G icon when the E-UTRAN new radio dual connection status in the network status parameter is “available” and “unrestricted”, the LTE network connection status is a connected state, and the 5G/LTE dual connection network coverage status is a covered state, as described in the above embodiment.

In an alternative implementation, the 5G icon display control module is configured to display the 5G icon when the new E-UTRAN dual radio connection status in the network status parameter is “available” and “unrestricted”, as described in the above embodiment.

Figure 4:
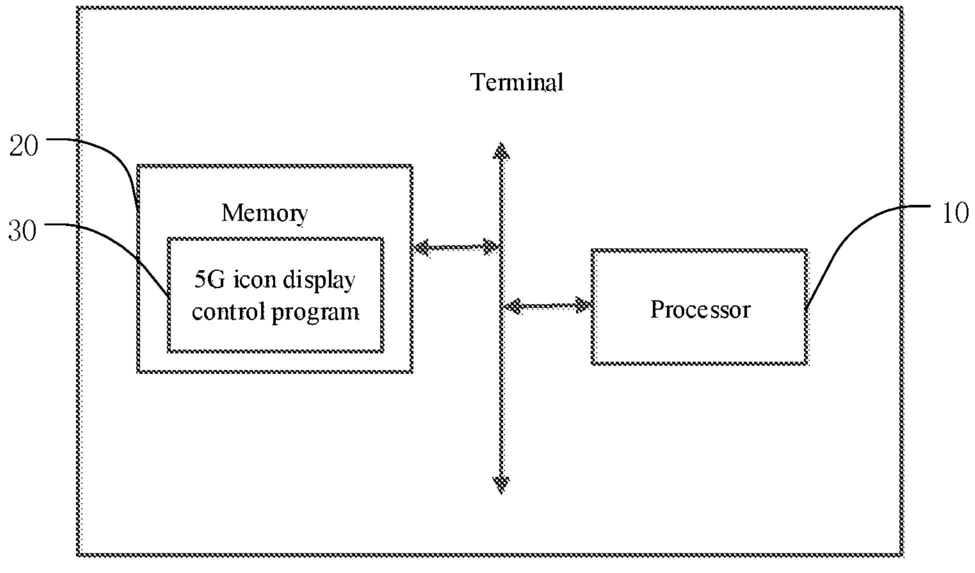
FIG. 4 is a schematic diagram of a terminal device an embodiment of the present disclosure.

Based on the 5G icon display control method according to the above embodiment, the present disclosure also provides a terminal device whose schematic block diagram may be shown in FIG. 4. The terminal device includes a processor 10 and a memory 20. it is to be understood that FIG. 4 illustrates only some of the components of the terminal device but it is to be understood that not all of the illustrated components are required to be implemented, and that more or fewer components may alternatively be implemented. In some embodiments, the memory 20 may be an internal storage unit of the terminal device, such as a hard disk or memory of the terminal device. In other embodiments, the memory 20 may further be an external storage device of the terminal device, such as a plug-in USB disk provided on the terminal device, a smart media card (SMC), a secure digital (SD), a flash card, etc. Further, the memory 20 may include both an internal storage unit and an external storage device of the terminal device. The memory 20 is configured to store application software installed on the terminal device and various types of data. The memory 20 may further be configured to temporarily store data that has been or is to be output. In an embodiment, the memory 20 thereon stores the 5G icon display control program 30, which may be executed by the processor 10 to implement the 5G icon display control method according to an embodiment of the present disclosure.

In some embodiments, the processor 10 may be a central processing unit (CPU), microprocessor, or other chip, and configured to run program code or processing data stored in the memory 20, for example, executing the 5G icon display control method. In an alternative implementation, the processor 10 may perform at least the following steps when executing a computer program:

- determining a target 5G icon display condition based on target setting information;
- obtaining a network status parameter;
- displaying a 5G icon, in response to the network status parameter meeting the target 5G icon display condition;

The network status parameter includes at least one of a 5G network registration status, a E-UTRAN new radio dual connection status, an LTE network connection status, or a 5G/LTE dual connection network coverage status.

The determining of the target 5G icon display condition based on the target setting information includes:

- determining the 5G icon display condition corresponding to the target setting information as the target 5G icon display condition based on pre-stored correspondence between the setting information and the 5G icon display condition.

The displaying of the 5G icon in response to the network status parameter meeting the target 5G icon display condition includes:

- displaying the 5G icon when the 5G network registration status in the network status parameter is registered.

The displaying of the 5G icon in response to the network status parameter meeting the target 5G icon display condition includes:

- displaying the 5G icon when the E-UTRAN new radio dual connection status in the network status parameter is “available” and “unrestricted”, the 5G/LTE dual connection network coverage status is a covered state, and the LTE network connection status is an unconnected state.

The displaying of the 5G icon in response to the network status parameter meeting the target 5G icon display condition includes:

displaying the 5G icon when the E-UTRAN new radio dual connection status in the network status parameter is "available" and "unrestricted", the LTE network connection status is a connected state, and the 5G/LTE dual connection network coverage status is a covered state.

The displaying of the 5G icon in response to the network status parameter meeting the target 5G icon display condition includes:

displaying the 5G icon when the new E-UTRAN dual radio connection status in the network status parameter is "available" and "unrestricted".

The obtaining of the network status parameter includes:

establishing a connection with a base station, and receiving information sent by the base station to obtain the network status parameter.

An embodiment of the present application is directed to a computer readable storage medium having stored thereon one or more computer programs executable by one or more processors, to perform the steps of the 5G icon display control method according to one of the above embodiments.

It should be noted that the above embodiments are merely illustrative of the technical solutions of the present disclosure, and not intended to limiting. Although the disclosure has been described in detail with reference to the foregoing embodiments, it will be understood by those of ordinary skill in the art that modifications may still be made to the technical solutions according to the foregoing embodiments, or substitutions may be made to some of the technical features thereof. These modifications or substitutions do not make the essence of the technical solutions thereof depart from the spirit and scope of the technical solutions of the embodiments of the present disclosure. The present disclosure is intended to cover any variations, applications or various of the present disclosure, which follow the general principles of the present disclosure and include common knowledge or common technical means in the art not disclosed in the present disclosure. The present disclosure is not limited to the specific structures described above and illustrated in the accompanying drawings, and various modifications and changes may be made without departing from the scope thereof. The scope of the disclosure is limited only by the appended claims. Any modifications, equivalents, modifications, or the like, which fall within the spirit and principles of the disclosure, are intended to be included within the scope of the disclosure.

What is claimed is:

1. A 5G icon display control method, comprising:

determining a 5G icon display condition corresponding to target setting information as a target 5G icon display condition based on pre-stored correspondence between setting information and the 5G icon display condition;

obtaining a network status parameter; and displaying a 5G icon, in response to the network status parameter meeting the target 5G icon display condition, wherein the network status parameter comprises at least one of a E-UTRAN new radio dual connection status, an LTE network connection status, or a 5G/LTE dual connection network coverage status, and wherein the target setting information is a network operator being used;

wherein the displaying of the 5G icon in response to the network status parameter meeting the target 5G icon display condition comprises:

displaying the 5G icon when the E-UTRAN new radio dual connection status in the network status parameter is "available" and "unrestricted", the 5G/LTE dual connection network coverage status is a covered state, and the LTE network connection status is an unconnected state.

2. The 5G icon display control method of claim 1, wherein the displaying of the 5G icon in response to the network status parameter meeting the target 5G icon display condition comprises:

displaying the 5G icon when the E-UTRAN new radio dual connection status in the network status parameter is "available" and "unrestricted", the LTE network connection status is a connected state, and the 5G/LTE dual connection network coverage status is a covered state.

3. The 5G icon display control method of claim 1, wherein the determining of the 5G icon display condition corresponding to the target setting information as the target 5G icon display condition based on the pre-stored correspondence between the setting information and the 5G icon display condition comprises:

receiving a target instruction, and determining the target setting information based on the target instruction.

4. The 5G icon display control method of claim 1, wherein the obtaining of the network status parameter comprises:

establishing a connection with a base station, and receiving information sent by the base station to obtain the network status parameter.

5. The 5G icon display control method of claim 4, wherein the receiving of the information sent by the base station to obtain the network status parameter comprises:

by receiving the information from the base station through a network module, obtaining the network status parameters; and reporting the network status parameter to a framework layer through the network module.

6. A 5G icon display control method, comprising:

determining a target 5G icon display condition based on target setting information;

obtaining a network status parameter; and displaying a 5G icon, in response to the network status parameter meeting the target 5G icon display condition, wherein the network status parameter comprises at least one of a 5G network registration status, a E-UTRAN new radio dual connection status, an LTE network connection status, or a 5G/LTE dual connection network coverage status;

wherein the displaying of the 5G icon in response to the network status parameter meeting the target 5G icon display condition comprises:

displaying the 5G icon when the E-UTRAN new radio dual connection status in the network status parameter is "available" and "unrestricted", the 5G/LTE dual connection network coverage status is a covered state, and the LTE network connection status is an unconnected state; or, displaying the 5G icon when the E-UTRAN new radio dual connection status in the network status parameter is "available" and "unrestricted", the LTE network connection status is a connected state, and the 5G/LTE dual connection network coverage status is a covered state; or, displaying the 5G icon when the new E-UTRAN dual radio connection status in the network status parameter is “available” and “unrestricted”.

7. The 5G icon display control method of claim 6, wherein the determining of the target 5G icon display condition based on the target setting information comprises:

determining a 5G icon display condition corresponding to the target setting information as the target 5G icon display condition based on pre-stored correspondence between setting information and the 5G icon display condition.

8. The 5G icon display control method of claim 6, wherein the displaying of the 5G icon in response to the network status parameter meeting the target 5G icon display condition comprises:

displaying the 5G icon when the 5G network registration status in the network status parameter is a registered state.

9. The 5G icon display control method of claim 6, wherein the target setting information is a network operator being used.

10. The 5G icon display control method of claim 6, wherein the target setting information is application environment information.

11. The 5G icon display control method of claim 6, further comprising: before determining the target 5G icon display condition based on the target setting information, receiving a target instruction, and determining the target setting information based on the target instruction.

12. The 5G icon display control method of claim 6, wherein the obtaining of the network status parameter comprises:

establishing a connection with a base station, and receiving information sent by the base station to obtain the network status parameter.

13. The 5G icon display control method of claim 12, wherein the receiving of the information sent by the base station to obtain the network status parameter comprises:

by receiving the information from the base station through a network module, obtaining the network status parameters; and reporting the network status parameter to a framework layer through the network module.

14. A terminal device, wherein the terminal device comprises a processor, a computer readable storage medium communicatively connected to the processor, wherein the computer readable storage medium is configured to store a plurality of instructions, the processor is configured to invoke instructions in the computer readable storage medium to perform operations of implementing the 5G icon display control method of claim 1.

15. A non-transitory computer readable storage medium storing one or more programs executable by one or more processors to implement operations in the 5G icon display control method of claim 1.

* * * * *